(12) United States Patent
Chen et al.

(10) Patent No.: US 11,645,739 B2
(45) Date of Patent: May 9, 2023

(54) IMAGE PROCESSING METHOD AND IMAGE PROCESSING SYSTEM

(71) Applicant: REALTEK SEMICONDUCTOR CORPORATION, Hsinchu (TW)

(72) Inventors: Yen-Ying Chen, Hsinchu (TW); Hsin-Ying Ou, Hsinchu (TW); Chia-Wei Yu, Hsinchu (TW); Chun-Hsing Hsieh, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 130 days.

(21) Appl. No.: 17/200,862

(22) Filed: Mar. 14, 2021

(65) Prior Publication Data
US 2022/0148139 A1  May 12, 2022

(30) Foreign Application Priority Data
Nov. 6, 2020 (TW) ................. 109138899

(51) Int. Cl.
| G06T 5/00 | (2006.01) |
|---|---|
| G06T 5/20 | (2006.01) |
| G06T 7/174 | (2017.01) |
| G06T 7/11 | (2017.01) |
| G06F 18/24 | (2023.01) |

(52) U.S. Cl.
CPC .............. *G06T 5/008* (2013.01); *G06F 18/24* (2023.01); *G06T 5/20* (2013.01); *G06T 7/11* (2017.01); *G06T 7/174* (2017.01)

(58) Field of Classification Search
CPC ... G06T 5/008; G06T 5/20; G06T 7/11; G06T 7/174; G06K 9/6267; G06V 10/26; G06V 10/809; G06V 10/764

USPC ......................................................... 382/224
See application file for complete search history.

(56) References Cited

U.S. PATENT DOCUMENTS

| 2011/0058603 A1* | 3/2011 | Chen ..................... H04N 19/18 |
|---|---|---|
| | | 375/240.01 |
| 2014/0072240 A1* | 3/2014 | Lee ......................... G06T 9/007 |
| | | 382/250 |
| 2020/0372648 A1* | 11/2020 | Zhang .................. G06V 10/764 |

FOREIGN PATENT DOCUMENTS

TW  202032387 A  9/2020

OTHER PUBLICATIONS

Li, G., Yun, I, Kim, J., & Kim, J. (2019). DABNet: Depth-Wise Asymmetric Bottleneck With Point-Wise Aggregation Decoder for Real-Time Semantic Segmentation in Urban Scenes. CoRR, abs/1907.11357.

(Continued)

*Primary Examiner* — Amandeep Saini
(74) *Attorney, Agent, or Firm* — WPAT, P.C., Intellectual Property Attorneys; Anthony King

(57) ABSTRACT

The present application provides an image processing method and an image processing system. The image processing method includes: obtaining a first image matrix; generating a first classified image matrix, wherein the first classified image matrix Includes a plurality of parts corresponding to a plurality of classification; obtaining a plurality of weightings, for a first image process, corresponding to the plurality of parts of the first classified image matrix, and generating a first weighting matrix accordingly; and performing the first image process upon the first image matrix according to the first weighting matrix to generate a first processed image matrix.

17 Claims, 4 Drawing Sheets

(56) References Cited

OTHER PUBLICATIONS

Chen, L., Papandreou, G., Kokkinos, I., Murphy, K., & Yuille, A. L. (2015). Semantic Image Segmentation with Deep Convolutional Nets and Fully Connected CRFs. ICLR40.

* cited by examiner

IMAGE PROCESSING METHOD AND IMAGE PROCESSING SYSTEM

CROSS-REFERENCE TO RELATED APPLICATIONS

This application claims priority of Taiwan application No. 109138899 filed on Nov. 6, 2020, which is incorporated by reference in its entirety.

TECHNICAL FIELD

The present application relates to image processing; in particular, to an image processing method and an image processing system.

BACKGROUND

In general image processing, images are analyzed, adjusted and processed to meet the user's visual, psychological or other requirements and to enhance the user's viewing experience. In the past, image processing was mostly performed by optical devices in analog mode, but due to the dramatic increase in computer speed, these techniques are rapidly being replaced by digital image processing methods, and there is still much room for improvement.

SUMMARY OF THE INVENTION

The present application discloses an image processing method, including: obtaining a first image matrix; generating a first classified image matrix according to the first image matrix, wherein said first classified image matrix includes a plurality of parts corresponding to a plurality of classifications; obtaining a plurality of weights for use in a first image processing that are corresponding to the plurality of parts of the first classified image matrix and generating a first weighting matrix accordingly; and performing the first image processing on the first image matrix according to the first weighting matrix to generate a first processed image matrix.

The present application discloses an image processing system, including: a receiving unit, configured to obtain a first image matrix; a non-transitory computer-readable medium, having a plurality of computer-readable instructions stored therein; a processor, coupled to the receiving unit and the non-transitory computer-readable medium; wherein upon the execution of the plurality of computer-readable instructions by the processor, the processor is configured to: generate a first classified image matrix according to the first image matrix, wherein said first classified image matrix includes a plurality of parts corresponding to a plurality of classifications; and obtain a plurality of weights for use in a first image processing that are corresponding to the plurality of parts of the first classified image matrix and generate a first weighting matrix accordingly; and an image processing unit, coupled to the receiving unit and the processor and configured to perform the first image processing on the first image matrix according to the first weighting matrix to generate a first processed image matrix.

The above-mentioned image processing method and image processing system can apply different weights to a plurality of parts in the image matrix when performing image processing, instead of treating the global domain of the image matrix identically when image processing, so as to improve users' viewing experience.

DETAILED DESCRIPTION

Figure 1:
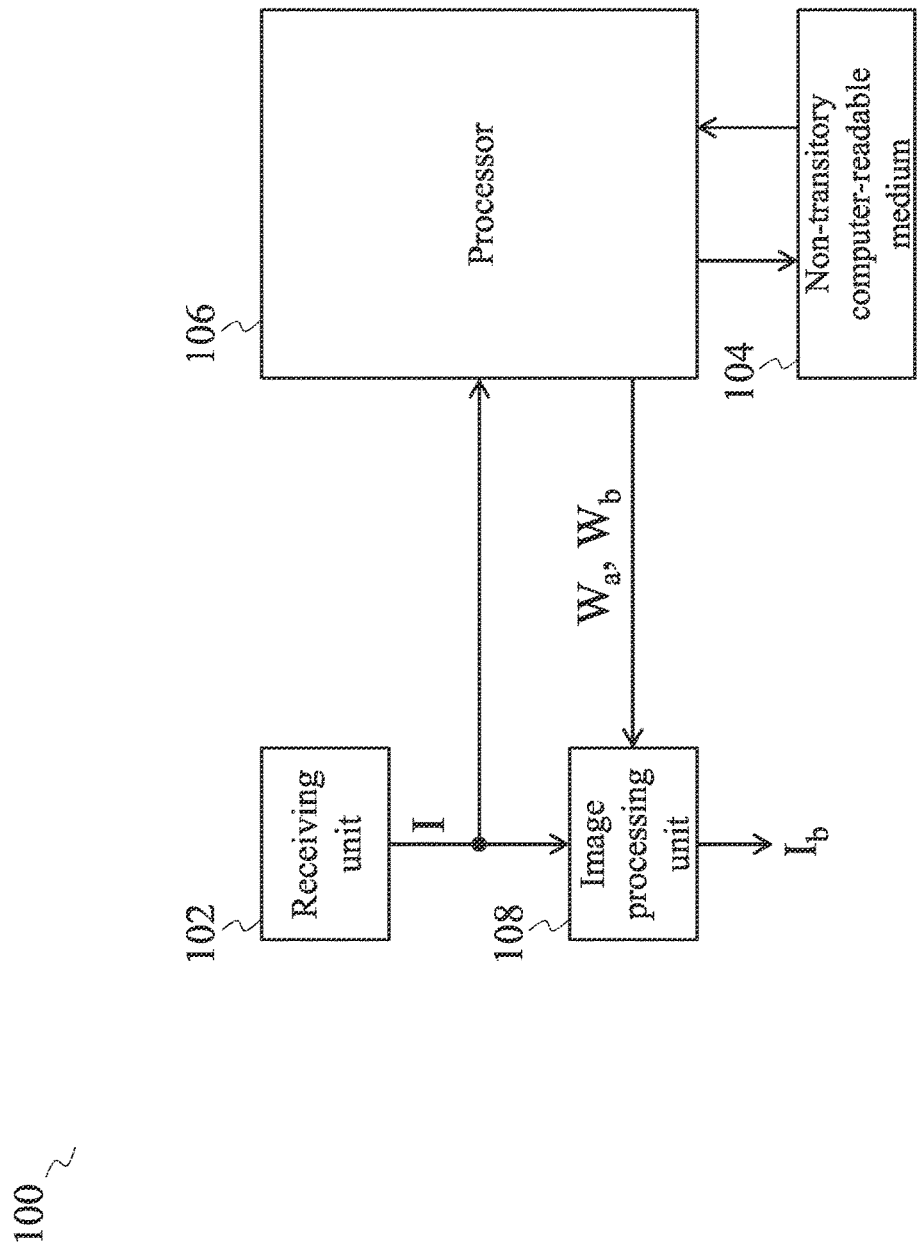
FIG. 1 is a schematic diagram illustrating an image processing system according to the first embodiment of the present application.
Figure 2:
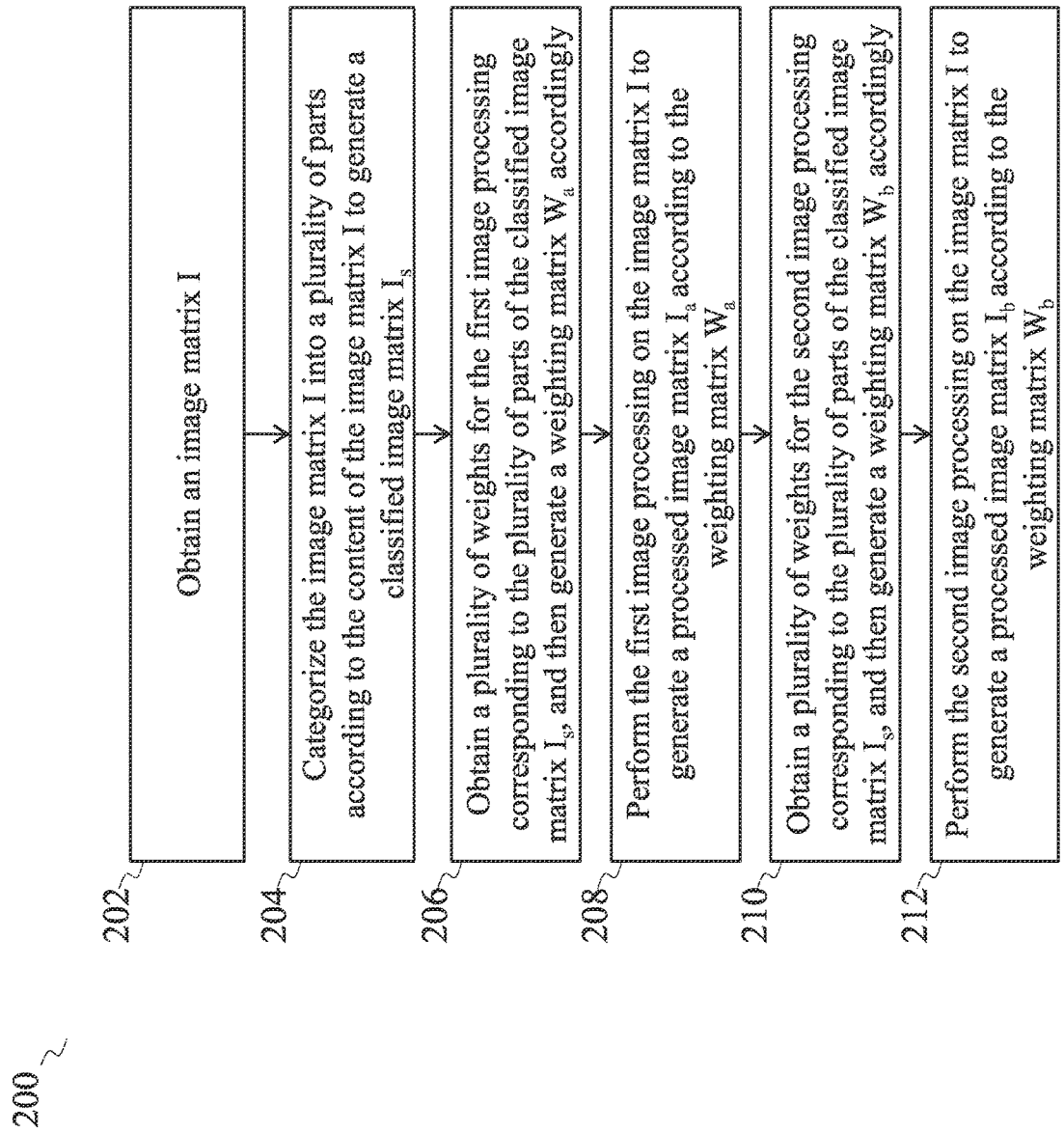
FIG. 2 is a flow diagram illustrating an image processing method according to embodiments of the present application.

FIG. 1 is a schematic diagram illustrating an image processing system 100 according to the first embodiment of the present application. The image processing system 100 includes a receiving unit 102, a non-transitory computer-readable medium 104, a processor 106 and an image processing unit 108, wherein the non-transitory computer-readable medium 104 has a plurality of computer-readable instructions stored therein, and when the plurality of computer-readable instructions are executed by the processor 106, the processor 106 is configured to perform specific process steps. FIG. 2 is a flow diagram illustrating an image processing method 200 according to embodiments of the present application. Reference is made to both FIG. 1 and FIG. 2, in Step 202, the receiving unit 102 is used to obtain an image matrix I. In the present embodiment, the image matrix I is a matrix consisting of a plurality of elements. For example, the value of each element is between 0 to 255, the image matrix I may be a grey-scale, red, green or blue image matrix, and a plurality of the image matrices I may form a video.

Figure 3:
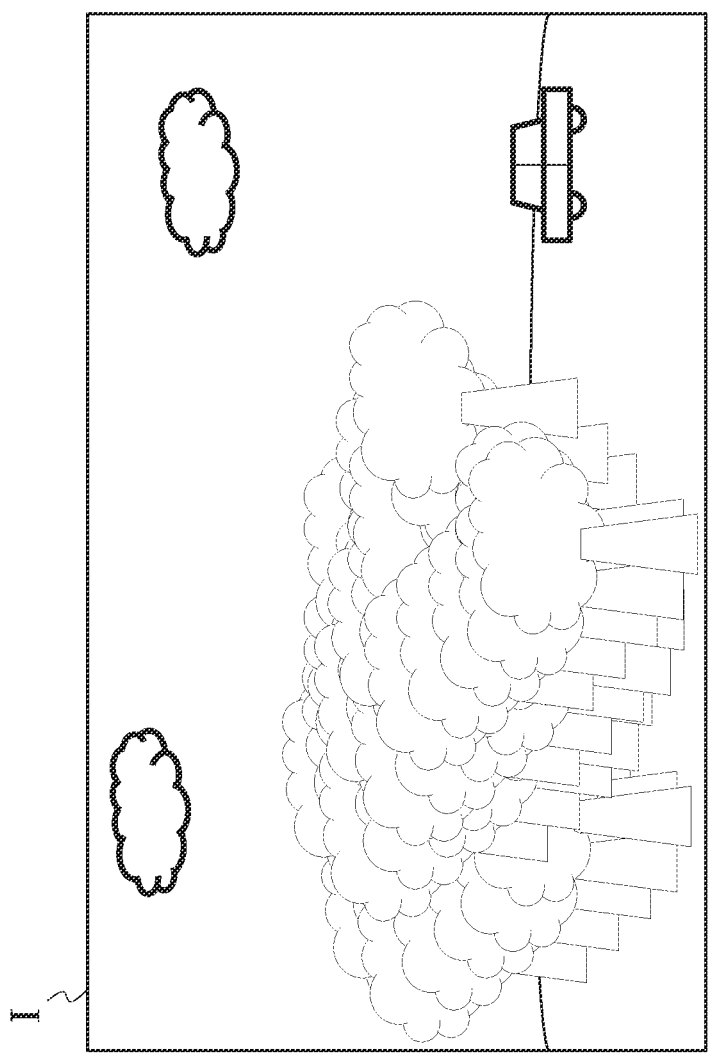
FIG. 3 shows an embodiment of the image matrix.
Figure 4:
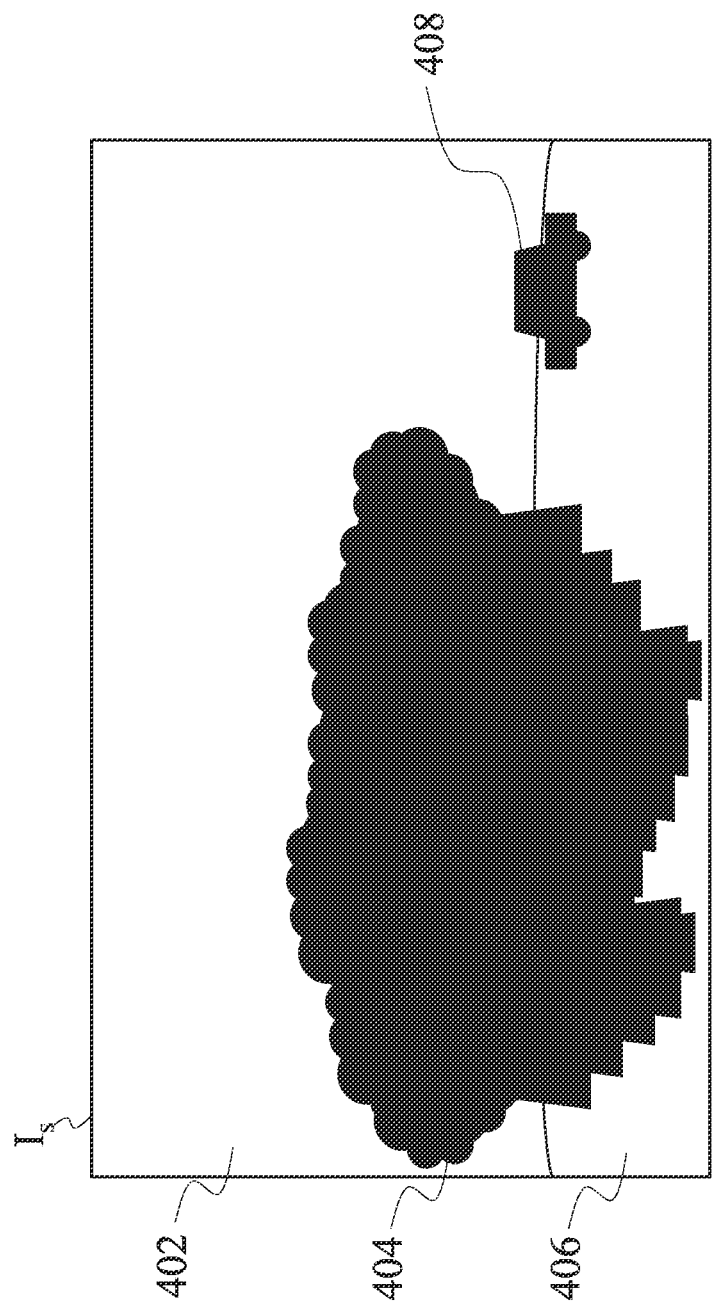
FIG. 4 shows an embodiment of the classified image matrix.

In Step 204, the processor 106 categorizes the image matrix I into a plurality of parts according to the content of the image matrix I to generate a classified image matrix $I_s$. Reference is made to both FIG. 3 and FIG. 4, which respectively shows embodiments of the image matrix I and the classified image matrix $I_s$. In the present embodiment, the processor 106 identifies the contents of the image matrix I and performs semantic segmentation to generate the image matrix $I_s$ in Step 204. As could be seen in FIG. 4, contents originally in the image matrix I would be categorized into sky 402, tree 404, ground 406 and vehicle 408 in the image matrix $I_s$, however, the present application does not particularly limit the specific algorithm of the semantic segmentation, for example, the semantic segmentation can be implemented using a deep learning model.

According to embodiments of the present application, the above-mentioned categories can be assigned with different weights when performing at least one specific image processing subsequently, rather than performing the specific image processing globally, thereby giving the user a better viewing experience (see detailed discussions below). Said at least one specific image processing may include a spatial noise reduction processing, sharpness processing, brightness processing, contrast processing, and saturation processing, among others. In the present embodiment, the at least one specific image processing includes performing, sequentially, a first image processing and a second image processing; however, the present application does not particularly limit the number of the at least one specific image processing, and the number can be one or more.

In Step 206, the processor 106 further obtains a plurality of corresponding weights with respect to the first image processing to be performed on the image matrix I, based on the portion of each category in the image matrix $I_s$, and then generate a weighting matrix $W_a$ accordingly. The processor 106 may obtain the plurality of weights for the first image processing from a preset first lookup table; for example, the first lookup table at least records the weights corresponding to each category in the image matrix $I_s$. For example, the first image processing may be a spatial noise reduction processing, whereas the first lookup table at least includes the following contents:

| Category | Weights |
|---|---|
| Sky | 1.2 |
| Tree | 0.8 |
| Ground | 1 |
| Vehicle | 0.7 |

Therefore, the processor 106 can generate the weighting matrix $W_a$ accordingly, which includes a plurality of elements corresponding to a plurality of elements in the image matrix I; in other words, each element in the image matrix I has a corresponding weight that is recorded in the weighting matrix $W_a$.

Next, in Step 208, the image processing unit 108 performs the first image processing on the image matrix I according to the weighting matrix $W_a$, so as to generate a processed image matrix $I_a$; for example, when the first image processing is the above-mentioned spatial noise reduction processing, the image processing unit 108 gives more weight to the sky portion in the image matrix I (i.e., corresponding to the sky 402 in the image matrix $I_s$) when performing the spatial noise reduction processing, compared to the weights it applies on the portions of the tree and vehicle (i.e., corresponding to the tree 404 and vehicle 408 in the image matrix $I_s$) so that the sky looks more clean and while more details of the trees and vehicles are preserved. With respect to the ground portion in the image matrix I (i.e., corresponding to the ground 406 in the image matrix $I_s$), its weight for the spatial noise reduction processing is between the sky and the tree.

In Step 210, the processor 106 further obtains a plurality of corresponding weights for the second image processing to be performed on the image matrix I based on each categorized portion in the image matrix $I_s$, and generate a weighting matrix $W_b$ accordingly. Since the second image processing differs from the first image processing, the weighting matrix $W_b$ may also differ from the weighting matrix $W_a$. The processor 106 may obtain the plurality of weights for the second image processing from a preset second lookup table; for example, the second lookup table at least records the weights corresponding to each category in the image matrix $I_s$. For example, the second image processing can be a sharpness processing. Therefore, the processor 106 can generate a weighting matrix $W_b$ correspondingly, which includes a plurality of elements corresponding to a plurality of elements in the image matrix I; in other words, each element in the image matrix I has a corresponding weight recorded in the weighting matrix $W_b$.

Next, in Step 212, the image processing unit 108 continues to perform the second image processing according to the weighting matrix $W_b$ on the processed image matrix $I_a$ that has been subject to the first image processing, so as to generate a processed image matrix $I_b$ and output it.

According to the second embodiment of the present application, before performing Step 204, the image matrix I can be subject to a downscaling processing according to a preset ratio, so as to generate a downscaled image matrix $I_d$, and then followed by Step 204, so that the processor 106 categorizes the downscaled image matrix $I_d$ into a plurality of parts according to the content of the downscaled image matrix $I_d$, so as to generate a classified image matrix $I_s$, in order to accelerate the computation process of the processor 106. In this way, after Step 206, the processor 106 has to perform an upscaling processing on the obtained weighting matrix $W_a$ for restoration according to the preset ratio so as to obtain an upscaled weighting matrix $W_{ua}$, and then proceeds to Step 208, so that the image processing unit 108 performs the first image processing on the image matrix I according to the upscaled weighting matrix $W_{ua}$, so as to generate the processed image matrix $I_a$. Similarly, an upscaling processing has to be performed between Step 210 and Step 212 for restoration.

In the third embodiment of the present application, after Step 206, the processor 106 may first perform a spatial filtering on the obtained weighting matrix $W_a$ and then proceed to Step 208; and after Step 210, the processor 106 may also perform a spatial filtering on the weighting matrix $W_b$ first and then proceeds to Step 212.

In the fourth embodiment of the present application, a plurality of continuous image matrices I form a video; after Step 206, the processor 106 may first perform a temporal filtering according to two weighting matrices $W_a$ obtained from the previous image matrix I and the current image matrix I, and then proceeds to Step 208; and after Step 210, the processor 106 may perform the temporal filtering on the weighting matrix $W_b$ first and then proceeds to Step 212.

The second to fourth embodiments may be combined as desired. Moreover, the implementation of the image processing system 100 may also vary; for example, the tasks performed by the image processing unit 108 may be performed by the processor 106, and hence, the image processing unit 108 can be removed; or the tasks performed by the processing unit 108 may be implemented using a specific circuit, and hence, the processing unit 108 and the non-transitory computer-readable medium 104 can be removed.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. It should be understood that the steps mentioned in the flowchart of the method of the present application can be adjusted in accordance with the actual needs except for those whose sequences are specifically stated, and can even be executed simultaneously or partially simultaneously. In addition, the above-mentioned modules or method steps can be implemented by hardware, software or firmware according to the designer's needs. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. An image processing method, comprising:
   obtaining a first image matrix;
   generating a first classified image matrix according to the first image matrix, wherein the first classified image matrix comprises a plurality of parts corresponding to a plurality of classifications;
obtaining a plurality of weights for use in a first image processing that are corresponding to the plurality of parts of the first classified image matrix, and generating a first weighting matrix accordingly;
performing the first image processing on the first image matrix according to the first weighting matrix to generate a first processed image matrix;
obtaining a second image matrix;
generating a second classified image matrix according to the second image matrix, wherein said second classified image matrix comprises a plurality of parts corresponding to a plurality of classifications;
obtaining a plurality of weights for use in the first image processing that are corresponding to the plurality of parts of the second classified image matrix, and generating a second weighting matrix accordingly; and
performing the first image processing on the second image matrix according to the second weighting matrix to generate a second processed image matrix.

2. The method of claim 1, wherein the generating the first classified image matrix according to the first image matrix comprises:
performing a semantic segmentation based on the first image matrix to generate the first classified image matrix.

3. The method of claim 1, wherein the obtaining the plurality of weights for use in the first image processing that are corresponding to the plurality of parts of the first classified image matrix comprises:
obtaining the plurality of weights for use in the first image processing that are corresponding to the plurality of classifications from a lookup table.

4. The method of claim 1, further comprising:
downscaling the first image matrix according to a preset ratio to generate a first downscaled image matrix, wherein the generating the first classified image matrix according to the first image matrix comprises:
categorizing the first downscaled the image matrix into the plurality of parts to generate the first classified image matrix according to contents of the first downscaled image matrix.

5. The method of claim 4, wherein the performing the first image processing on the first image matrix according to the first weighting matrix to generate the first processed image matrix comprises:
upscaling the first weighting matrix according to the preset ratio to generate first upscaled weighting matrix, and according to the first upscaled weighting matrix, performing the first image processing on the first image matrix to generate the first processed image matrix.

6. The method of claim 1, further comprising the step of:
performing a spatial filtering on the first weighting matrix to generate a first spatial filtered weighting matrix.

7. The method of claim 6, wherein the performing the first image processing on the first image matrix according to the first weighting matrix to generate the first processed image matrix comprises:
performing the first image processing on the first image matrix according to the first spatial filtered weighting matrix to generate the first processed image matrix.

8. The method of claim 1, further comprising:
performing a temporal filtering on the second weighting matrix according to the first weighting matrix and the second weighting matrix to generate a second temporal filtered weighting matrix; and
the performing the first image processing on the second image matrix according to the second weighting matrix to generate the second processed image matrix comprises:
performing the first image processing on the second image matrix according to the second temporal filtered weighting matrix to generate the second processed image matrix.

9. An image processing method, comprising:
obtaining a first image matrix;
generating a first classified image matrix according to the first image matrix, wherein the first classified image matrix comprises a plurality of parts corresponding to a plurality of classifications;
obtaining a plurality of weights for use in a first image processing that are corresponding to the plurality of parts of the first classified image matrix, and generating a first weighting matrix accordingly;
performing the first image processing on the first image matrix according to the first weighting matrix to generate a first processed image matrix;
obtaining a plurality of weights for use in a second image processing that are corresponding to the plurality of parts of the first classified image matrix, and generating a third weighting matrix accordingly; and
performing the second image processing on the first processed image matrix according to the third weighting matrix to generate a third processed image matrix.

10. An image processing system, comprising:
a receiving unit, for obtaining a first image matrix;
a non-transitory computer-readable medium, including a plurality of computer-readable instructions stored therein;
a processor, coupled to the receiving unit and the non-transitory computer-readable medium;
wherein upon execution of the plurality of computer-readable instructions by the processor, the processor is configured to:
generate a first classified image matrix according to the first image matrix, wherein said first classified image matrix comprises a plurality of parts corresponding to a plurality of classifications; and
obtain a plurality of weights for use in a first image processing that are corresponding to the plurality of parts of the first classified image matrix, and generate a first weighting matrix accordingly;
perform a spatial filtering on the first weighting matrix to generate a first spatial filtered weighting matrix; and
an image processing unit, coupled to the receiving unit and the processor and configured to perform the first image processing on the first image matrix according to the first spatial filtered weighting matrix to generate a first processed image matrix.

11. The system of claim 10, wherein upon the execution of the plurality of computer-readable instructions by the processor, the processor is configured to perform a semantic segmentation based on the first image matrix to generate the first classified image matrix.

12. The system of claim 10, wherein upon the execution of the plurality of computer-readable instructions by the processor, the processor is configured to obtain the plurality of weights for use in the first image processing that are corresponding to the plurality of classifications from a lookup table.

13. The system of claim 10, wherein upon the execution of the plurality of computer-readable instructions by the processor, the processor is further configured to:
- downscale the first image matrix according to a preset ratio to generate a first downscaled image matrix, wherein the processor categorizes the first downscaled the image matrix into the plurality of parts to generate the first classified image matrix according to contents of the first downscaled image matrix.

14. The system of claim 13, wherein upon the execution of the plurality of computer-readable instructions by the processor, the processor is configured to upscale the first weighting matrix according to the preset ratio to generate a first upscaled weighting matrix, and perform the first image processing on the first image matrix according to the first upscaled weighting matrix to generate the first processed image matrix.

15. The system of claim 10, wherein:
- the receiving unit is further configured to obtain a second image matrix; wherein upon the execution of the plurality of computer-readable instructions by the processor, the processor is further configured to:
- generate a second classified image matrix according to the second image matrix, wherein said second classified image matrix comprises a plurality of parts corresponding to a plurality of classifications; and
- obtain a plurality of weights for use in the first image processing that are corresponding to the plurality of parts of the second classified image matrix and generate a second weighting matrix accordingly; and
- the image processing unit is further configured to perform the first image processing on the second image matrix according to the second weighting matrix to generate a second processed image matrix.

16. The system of claim 15, wherein:
upon the execution of the plurality of computer-readable instructions by the processor, the processor is further configured to perform a temporal filtering on the second weighting matrix according to the first weighting matrix and the second weighting matrix to generate a second temporal filtered weighting matrix;
wherein the image processing unit performs the first image processing on the second image matrix according to the second temporal filtered weighting matrix to generate the second processed image matrix.

17. The system of claim 10, wherein:
upon the execution of the plurality of computer-readable instructions by the processor, the processor is further configured to obtain a plurality of weights for use in a second image processing that are corresponding to the plurality of parts of the first classified image matrix and generate a third weighting matrix accordingly; and
the image processing unit is further configured to perform the second image processing on the first processed image matrix according to the third weighting matrix to generate a third processed image matrix.

* * * * *